US008811579B2

(12) United States Patent
Aerrabotu et al.

(10) Patent No.: US 8,811,579 B2
(45) Date of Patent: Aug. 19, 2014

(54) LOCATION AWARE SPEED DIAL ON A COMMUNICATION DEVICE

(75) Inventors: Naveen Aerrabotu, Gurnee, IL (US); Shyam Narayan, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 110 days.

(21) Appl. No.: 13/337,330

(22) Filed: Dec. 27, 2011

(65) Prior Publication Data
US 2013/0163733 A1    Jun. 27, 2013

(51) Int. Cl.
*H04M 11/00*    (2006.01)
(52) U.S. Cl.
CPC .................. *H04M 11/00* (2013.01)
USPC ............... 379/93.17; 379/90.01; 379/216.01; 379/354; 379/93.05; 455/564
(58) Field of Classification Search
CPC ............. H04M 3/42; H04M 1/72572; H04M 1/274558; H04M 11/00
USPC .......... 379/90.01, 90.17, 93.05, 216.01, 354, 379/368, 355.02; 455/564, 456.6
See application file for complete search history.

(56) References Cited

U.S. PATENT DOCUMENTS

| | | | |
|---|---|---|---|
| 6,983,044 B2 | 1/2006 | Clifton et al. | |
| 7,983,718 B1* | 7/2011 | Roka | 455/566 |
| 2002/0068599 A1 | 6/2002 | Rodriguez et al. | |
| 2007/0036137 A1 | 2/2007 | Horner et al. | |
| 2008/0004080 A1* | 1/2008 | Li et al. | 455/564 |
| 2008/0176585 A1* | 7/2008 | Eldering | 455/456.6 |
| 2008/0250066 A1* | 10/2008 | Ekstrand et al. | 707/104.1 |
| 2009/0016519 A1* | 1/2009 | Bedingfield et al. | 379/216.01 |
| 2009/0041224 A1 | 2/2009 | Bychkov et al. | |
| 2010/0322409 A1* | 12/2010 | Haitani et al. | 379/354 |
| 2012/0323933 A1* | 12/2012 | He et al. | 707/749 |

FOREIGN PATENT DOCUMENTS

EP    2150033 A1    2/2010

* cited by examiner

*Primary Examiner* — Melur Ramakrishnaiah
(74) *Attorney, Agent, or Firm* — Shumaker & Sieffert, P.A.

(57) ABSTRACT

A method of assigning contacts to a speed dial function. The method can include identifying contacts that are candidates to be assigned to the speed dial function on a communication device. The method also can include identifying a geographic distance between each of the identified candidates and the communication device. The method further can include, via a processor, assigning a first of the identified candidates that is closest to the communication device to a first speed dial indicator, and assigning a second of the identified candidates that is next closest to the communication device to a second speed dial indicator.

13 Claims, 5 Drawing Sheets

LOCATION AWARE SPEED DIAL ON A COMMUNICATION DEVICE

BACKGROUND OF THE INVENTION

1. Field of the Invention

The present invention generally relates to communication devices and, more particularly, to providing speed dial functionality on the communication device.

2. Background of the Invention

The use of mobile communication devices, for example smart phones and tablet computers, is prevalent throughout most of the industrialized world. Modern communication devices typically include an operating system, such as Android™ Windows Phone®, iOS®, and the like. These operating systems provide various user menus via their respective user interfaces. Via these menus, users can access various features and functionality provided by the respective communication devices, for example to place calls, send text messages, access the Internet, and so on.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present arrangements relate to a method of assigning contacts to a speed dial function. The method can include identifying contacts that are candidates to be assigned to the speed dial function on a communication device. The method also can include identifying a geographic distance between each of the identified candidates and the communication device. The method further can include, via a processor, assigning a first of the identified candidates that is closest to the communication device to a first speed dial indicator, and assigning a second of the identified candidates that is next closest to the communication device to a second speed dial indicator.

The present arrangements also relate to a communication device. The communication device can include a processor configured to identify contacts that are candidates to be assigned to the speed dial function on a communication device, identify a geographic distance between each of the identified candidates and the communication device, assign a first of the identified candidates that is closest to the communication device to a first speed dial indicator, and assign a second of the identified candidates that is next closest to the communication device to a second speed dial indicator.

Yet another arrangement can include a computer program product including a computer-readable storage device having computer-readable program code stored thereon that, when executed, causes a machine to perform the various steps and/or functions described herein.

Figure 1:
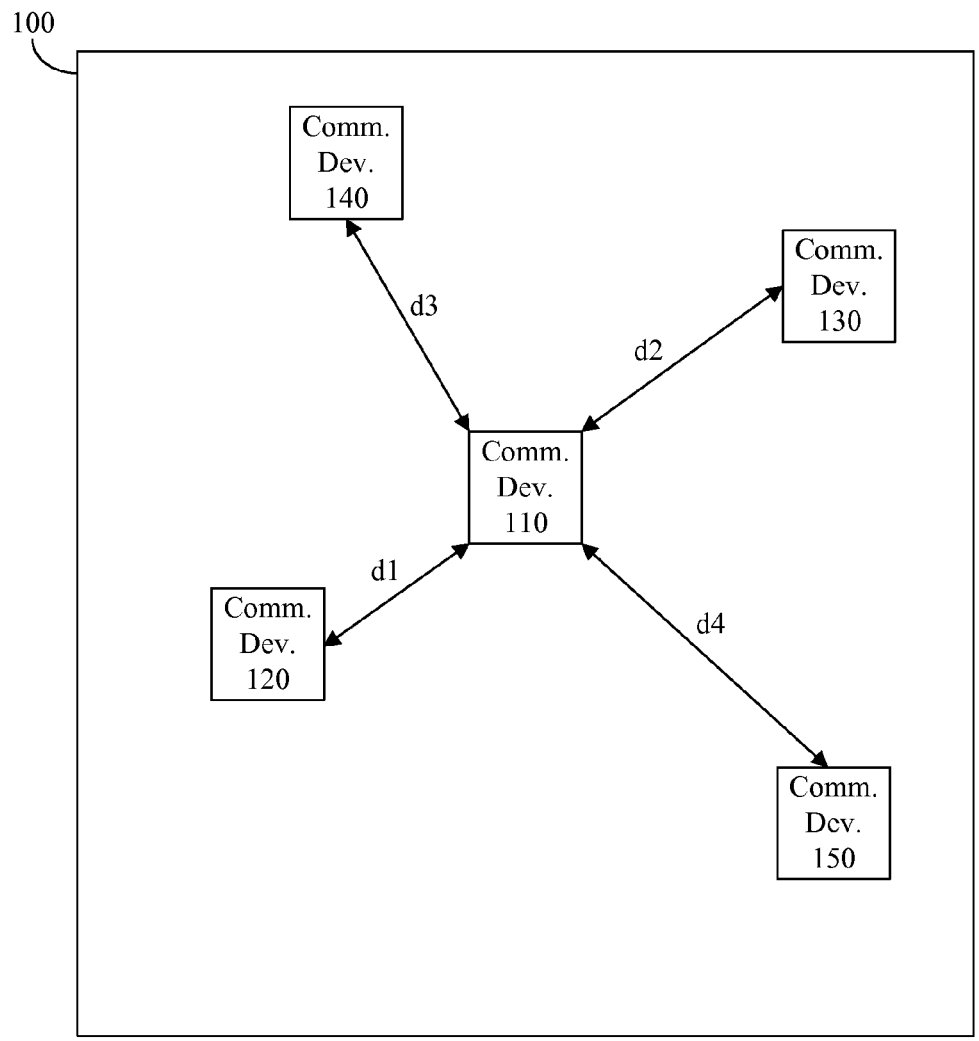
FIG. 1 depicts a communication system that is useful for understanding the present invention.

FIG. 1 depicts a geographic region 100 in which a plurality of communication devices 110, 120, 130, 140, 150 are located, which is useful for understanding the present invention. Arrangements described herein relate to automatically and dynamically assigning one or more of a user's contacts to a speed dial function. Specifically, the contacts can be assigned to speed dial buttons or keys of a communication device 110 based on the geographic distance between the communication devices, for example the respective geographic distance between the communication devices 120, 130, 140, 150, each of which is associated with a respective contact, and the user's communication device 110. In this regard, the respective geographic distances can represent the distances between the respective contacts and the user.

The geographic distance between the communication device 110 and the communication device 120 is indicated as being d1. The geographic distance between the communication device 110 and the communication device 130 is indicated as being d2. The geographic distance between the communication device 110 and the communication device 140 is indicated as being d3. The geographic distance between the communication device 110 and the communication device 150 is indicated as being d4.

The communication device 110 can determine its location. For example, the communication device 110 can determine its location using a global positioning satellite (GPS) system, trilateration derived from communication links with base station transceivers or repeaters, or in any other suitable manner. The locations of the communication devices 120-150 can be derived in a similar manner. Moreover, the communication devices 120-150 can communicate their respective locations to the communication device 110, and/or to a processing system (e.g., a server) from which the communication device 110 can receive the respective locations of the communication devices 120-150.

Based on the location of the communication device 110 and the location of the communication devices 120-150, the communication device 110 (or another system to which the communication device 110 is communicatively linked) can determine the geographical distance d1, d2, d3, d4 between the communication device 110 and each of the respective communication devices 120-150. Based on the geographic distances d1-d4, the communication device 110 can rank respective contacts associated with the communication devices 120-150.

For example, the user can have a contact group named "friends," or have a plurality of contacts who the user frequently calls or messages, and such contacts can be identified as candidates to be associated with speed dial functionality on the communication device. From among these contacts, those who have chosen to share their geographic location information with the user can be categorized based on their present geographic distance from the user's communication device.

The contact (via communication device 120) geographically closest to the user (via communication device 110) can be assigned to a first speed dial indicator, the contact (via communication device 120) geographically next closest to the user can be assigned to a second speed dial indicator, and so on. When the user selects a particular key or button associated with a speed dial indicator, the communication device can automatically initiate communication with the contact associated with the speed dial indicator, for example to place a telephone call, a place video call, send a text message, send an instant message, or the like. Visual indication of the assigned speed dial contact may be provided by use of a displayed image, a displayed name, a displayed telephone number, a displayed e-mail address, or some known code or identifier associated with the contact that is displayed.

The communication devices 110-150 can communicate with one another via any suitable communication network(s). Examples of suitable communication networks include, but are not limited to, a public communication network, such as the Internet, a cellular communication network, and a private communication network, such as an intranet.

Figure 2:
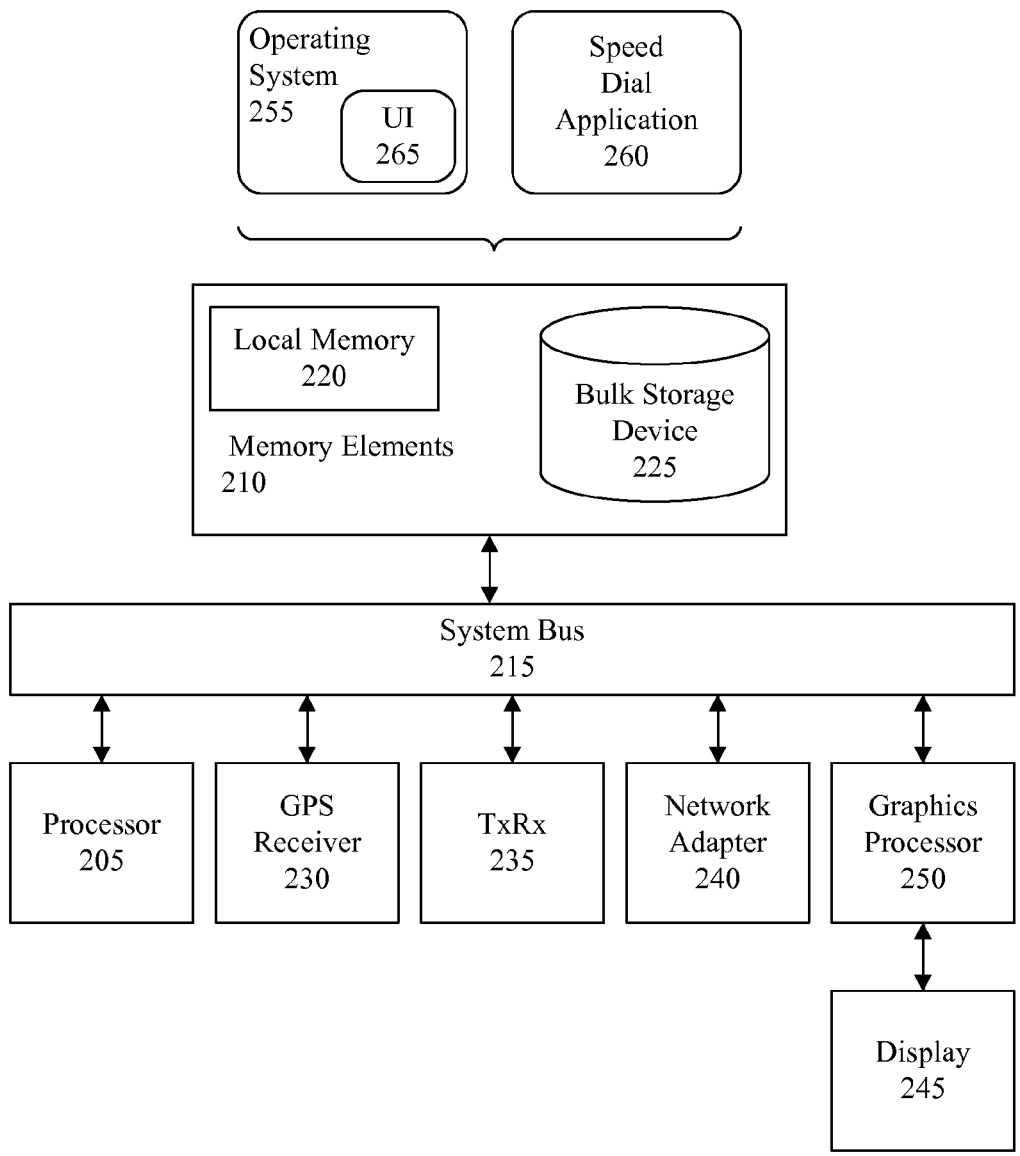
FIG. 2 is a block diagram illustrating a communication device that is useful for understanding the present invention.

FIG. 2 is a block diagram illustrating a communication device 200 that is useful for understanding the present invention. The communication device 200 can correspond to any of the communication devices 110-150 of FIG. 1. In one arrangement, the communication device can be a mobile communication device, such as a mobile phone, such as a smart phone, a mobile computer, such as a tablet computer or laptop computer, a personal digital assistant (PDA), or the like. In this regard, the communication device 200 can be configured to provide voice, audio/video and/or text communications. In another arrangement, the communication device 200 can be a processing system, such as a computer, configured to provide voice, audio/video and/or text communications. It should be appreciated, however, that the communication device 200 can be implemented in the form of any system comprising a processor and memory that is capable of performing the functions described within this specification, for example by storing and/or executing program code.

In this regard, the communication device 200 can include at least one processor 205 coupled to memory elements 210 through a system bus 215. As such, the communication device 200 can store program code within memory elements 210. The processor 205 can execute the program code accessed from memory elements 210 via the system bus 215. The processor can comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The memory elements 210 can include one or more physical memory devices such as, for example, local memory 220 and one or more bulk storage devices 225, that store data. Local memory 120 refers to random access memory or other non-persistent memory device(s) generally used during actual execution of the program code. The bulk storage device(s) 225 can be implemented as a hard disk drive (HHD), flash memory, for example as a solid state drive (SSD), or other persistent data storage device. The communication device 200 also can include one or more cache memories (not shown) that provide temporary storage of at least some program code in order to reduce the number of times program code must be retrieved from the bulk storage device 225 during execution.

The communication device 200 also can include a GPS receiver 230 that receives signals from a GPS system to identify the present location of the communication device 200. GPS receivers are well known to those skilled in the art. The GPS receiver 230 can be communicatively linked to the processor via the system bus 215.

The communication device 200 further can include a transceiver 235 coupled to the processor 205 via the system bus 215. The transceiver 235 can modulate and demodulate signals to convert signals from one form to another, and can transmit and/or receive such signals over one or more various wireless communication networks. In illustration, the transceiver 235 can be configured to communicate data via IEEE 802 wireless communications, for example, 802.11 and 802.16 (WiMax), WPA, or WPA2. In another example, the transceiver 235 can communicate data via TDMA, CDMA, WCDMA, GSM, UMTS, GPRS, EUTRAN, UMB, OFDM, LTE, HSPA+, direct wireless communication, etc. Further, the transceiver 235 also can be configured to communicate over a wireless communication link using any of a myriad of communications protocols.

In addition to, or in lieu of, the transceiver 235, the communication device 200 can include a network adapter 240 coupled to the processor 205 via the system bus 215. Modems, cable modems, and Ethernet cards are examples of different types of network adapters 240 that can be used with the communication device 200.

The communication device further can include a display 245. In one arrangement, a graphics processor 250 can be provided graphics processing for images and video presented on the display 245. In another arrangement, the graphics processing can be performed by the processor 205. The display can be a touchscreen, though this need not be the case. Other input/output (I/O) devices, such as a keypad, a keyboard, buttons, keys, a mouse, an audio processor, or the like also can be coupled to the communication device 200, either directly to the system bus 215 or through intervening I/O controllers.

The memory elements can store an operating system 255 and a speed dial application 260, each of which can be implemented in the form of computer-readable program code executable by the processor 205. The operating system 255 can include a user interface (UI) module 265. During execution, the UI module 265 can present images and/or video on the display, output audio, receive user inputs, and the like. During execution, the speed dial application 260 can process distance information to rank, or categorize, contacts of the user based on the proximity of those contacts to the user, and associate contacts with speed dial buttons or keys as described herein. In this regard, the speed dial application 260 can pass information relevant to the association of contacts with the speed dial buttons or keys to the UI module 265, which can identify such associations in one or more UI menus.

To generate the distance information, the speed dial application 260 can receive, via the transceiver 235 and/or network adapter 240, geographic location information for other communication devices associated with contacts who share their present geographic location information with the user of the communication device 200. Such geographic location information can be received from the other communication devices, or from a server to which such other communication devices are communicatively linked. The speed dial application 260 can process the geographic location information received for the other communication devices along with geographic location information representing the present location of the communication device to determine the geographic distance between the communication device 200 and the other communication devices.

The communication device 200 also can receive updated geographic location for the other communication devices, for example when the communication device 200 and/or other communication devices move. In another arrangement, the communication device 200 also can receive updated geographic location for the other communication devices at regular time intervals. In illustration, the communication device 200 can receive updated geographic location information from the other communication devices every minute, every five minutes, every ten minutes, etc. When the communication device 200 receives the updated geographic location, the communication device 200 can re-determine the geographic distance between the communication device 200 and the other communication devices.

In another arrangement, a server (not shown) can obtain the geographic location information for the communication device 200 and the other communication devices, determine the respective geographic distances between the communication device 200 and the other communication devices, and can communicate the respective geographic distances to the communication device. Moreover, the server can provide updates to the geographic distances when the communication device 200 or the other communication devices move, or provide updates to the geographic distances at regular intervals.

The UI 265 can update, or refresh, the UI menus when updated geographic information is received to re-categorize or re-rank the contacts in the UI menus in response to the geographic distances changing and the speed dial application 260 (or server) determines that the ranking of which other communication devices are nearest to the communication device 200. As will be described, the UI 265 can update, or refresh, the UI menus when the geographic distances change, at regular intervals, or when the user closes a particular UI menu and re-opens the UI menu, when the user navigates away from a particular UI menu and then returns to the UI menu, when the user selects a refresh button or key, or the like.

Figure 3:
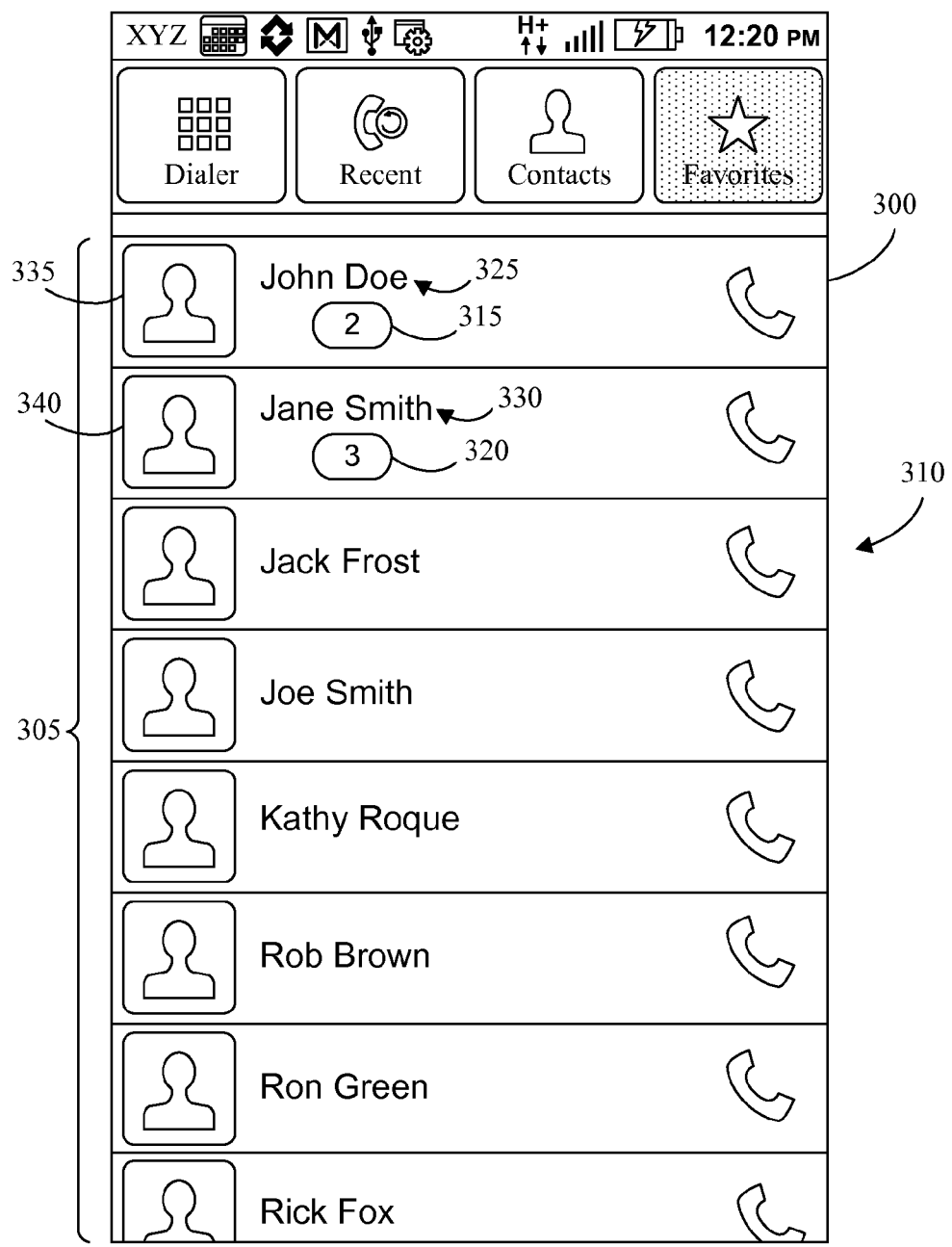
FIG. 3 depicts a user interface menu that is useful for understanding the present invention.

FIG. 3 depicts a UI menu 300 that is useful for understanding the present invention. The menu 300 can be a favorites menu presented on the communication device via the UI. The menu 300 can present, among other things, a listing of contacts 305 whose contact information is known to the communication device. The contact information can be, for example, stored in a contact directory. The contact directory can be stored on the communication device, or on another system with which the communication device is communicatively linked.

In one arrangement, the contacts 305 presented in the menu 300 can be a subset of all of the user's contacts. For example, the menu 300 can present contacts in a particular group, for example "friends" or "work contacts," the menu 300 can present contacts 305 with whom the user has recently communicated, or the menu 300 can present contacts 305 with whom the user communicates most frequently. Such contacts can be candidates to be assigned the speed dial function. In one arrangement, a decision of whether a contact is a frequent contact can be based on a threshold value relating to how many times the user communicated with the contact in a particular time frame. Moreover, this threshold value can be user defined or user selectable. For example, the user can specify frequent contacts as those contacts the user communicates with at least three times per week.

In the menu 300, the contacts 305 can be ranked, or categorized. For example, those contacts 305 whose present location is known to the communication device can be presented at the top of a contact list 310 in the menu 300. Moreover, those contacts 305 who are nearest to the communication device, and thus the user, can be presented at the top of the contact list 310, and speed dial indicators 315, 320 can be assigned to such contacts 305. The speed dial indicators 315, 320 can be presented proximate to the identifiers associated with the respective contacts, for example names 325, 330 of the respective contacts, to whom the speed dial indicators are assigned.

In illustration, if John Doe's present location is known, and John Doe is closest to the communication device, John Doe can be presented in a top position of the contact list 310 and assigned a speed dial indicator 315 (e.g., the numeral "2"). If Jane Smith's present location is known, and Jane Smith is next closest to the communication device, Jane Smith can be presented in a next position immediately below John Doe in the contact list 310 and assigned a speed dial indicator 320 (e.g., the numeral "3"). Of course, additional speed dial indicators can be assigned to other contacts 305 in the contact list 310 based on ranking of the contacts, and the invention is not limited in this regard. For example, Jack Frost can be presented in a next position immediately below Jane Smith assigned a next speed dial indicator (e.g., the numeral "4"), Joe Smith can be presented in a next position immediately below Jack Frost and assigned a following speed dial indicator (e.g., the numeral "5"), and so on.

In other arrangements, in lieu of the names 325, 330, or in addition to the names 325, 330, other identifiers can be presented in the menu 300 and associated with the respective contacts 305. Examples of such identifiers can include, but are not limited to, displayed images (e.g., images 335, 340), displayed telephone numbers, displayed e-mail addresses, or some known codes or identifiers associated with the contacts. The identifiers can be positioned in the sections of the contact list 310 associated with the respective contacts 305. For example, the image 335 associated with John Doe can be presented proximate to the name "John Doe" 325 and the speed dial indicator 315, and the image 340 associated with Jane Smith can be presented proximate to the name "Jane Smith" 330 and the speed dial indicator 320.

The user may desire to not have speed dial indicators automatically assigned to users who are not geographically close to the user. A threshold value can be set to define the maximum distance from the location of the user. This threshold value can be user defined or user selectable. If a contact is presently located further from the user than the threshold value, a speed dial indicator need not be assigned to that contact. In other words, for the purpose of assigning a speed dial indicator, contacts located further away from the user than the threshold value can be ignored. Further, the UI can provide a menu (not shown) to enable the user to turn off or turn on the speed dial functionality.

Some of the contacts 305 may be travelling, and thus the ranking of which contact is closest to the user may change from time to time. In one arrangement, the contact list 310 can automatically update, or refresh, to reflect a change in rankings. For example, when the rankings of the contacts change, the speed dial indicators 315, 320 assigned to the contacts also can change. In illustration, if Jane Smith moves to the top position of the contact list 310, she can be assigned the speed dial indicator 315, and the person in the next position immediately below Jane Smith can be assigned the speed dial indicator 320.

Such update, or refresh, can be applied to the contact list 310 when the change in rankings is detected, or a refresh rate for the contact list 310 can be applied, for example every minute, every five minutes, every ten minutes, etc. In another arrangement, once the menu 300 is opened, the contact list 310 can remain static. The change in rankings can be reflected in the contact list 310 when the menu 300 is closed and re-opened, reflected in the contact list 310 when the user navigates away from the menu 300 and returns to the menu 300, or reflected in the contact list 310 when the user selects a refresh button or key.

In another arrangement, the contacts 305 can be ranked, or categorized, in the contact list 310 based on how often the user communicates with the contacts 305. For example, if the user communicates most frequently with John Doe, John Doe can be presented at the top of the contact list 310, even though Jane Smith may be presently located closer to the user.

The user can use indicated the speed dial indicators 315, 320 to initiate communication with the respective contacts. For example, the user can depress a "2" button or key on the communication device to initiate communication with John Doe, or depress a "3" button or key on the communication device to initiate communication with Jane Smith. In another arrangement, the user can select the speed dial indicator 315 to initiate communication with John Doe, or select the speed dial indicator 320 to initiate communication with Jane Smith. In an arrangement in which the display is a touchscreen, the speed dial indicators 315, 320 can be selected with an appendage or stylus. In an arrangement in which the display is not a touch screen, the speed dial indicators 315, 320 can be selected with a cursor, a key stroke, or in another suitable manner. The communication can be initiated using a default communication mode (e.g., place a telephone call, a video call or sent a text message), or initiated using a communication mode typically used by the user to communicate with the respective contacts 305.

Figure 4:
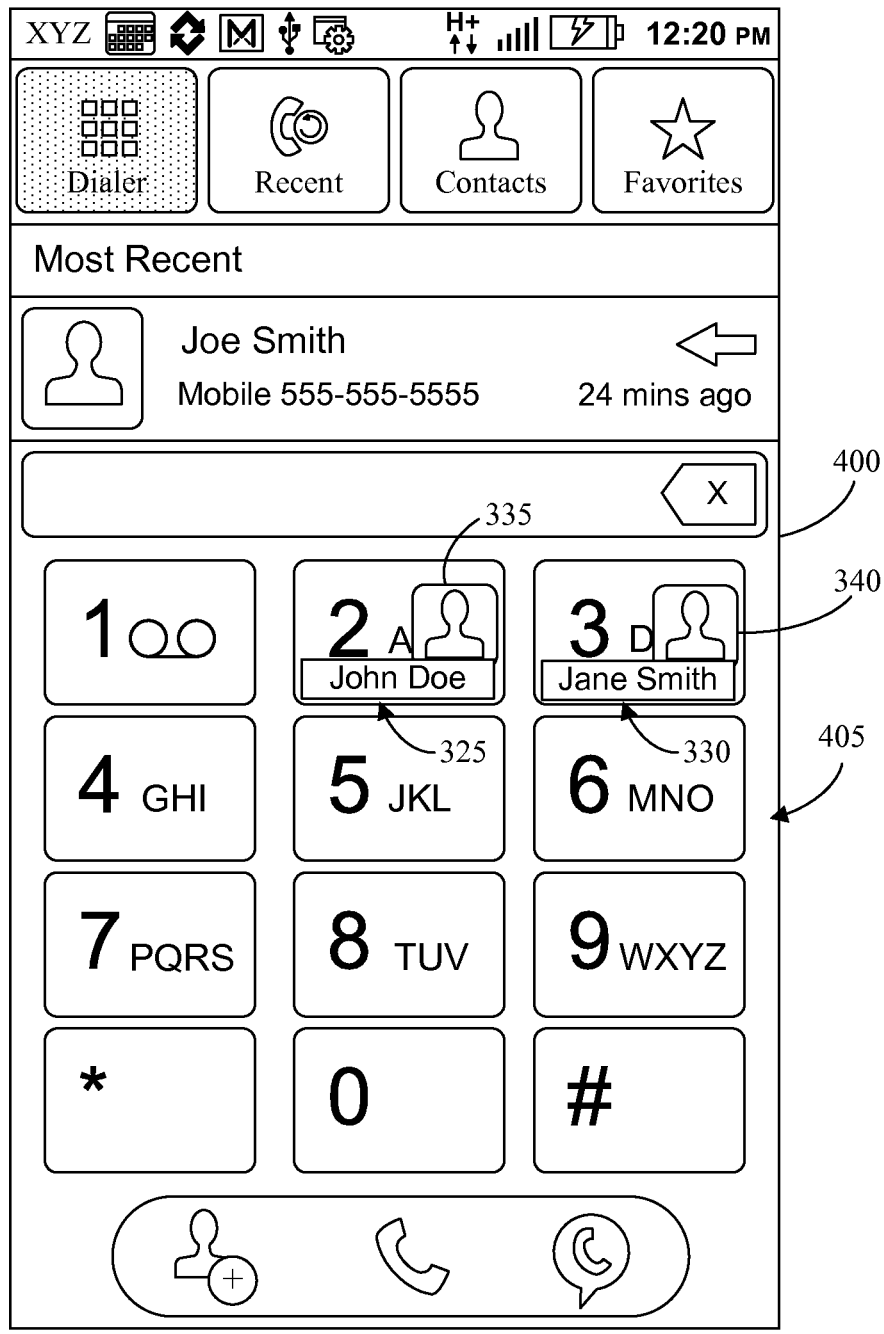
FIG. 4 depicts another user interface menu that is useful for understanding the present invention.

FIG. 4 depicts another UI menu 400 that is useful for understanding the present invention. The menu 400 can be a dial menu presented on the communication device via the UI. The menu 400 can present, among other things, a keypad 405. The keypad can comprise the numerals 0-9, an asterisk ("*") key and a number sign ("#"). Oftentimes the numeral "1" is assigned as a speed dial number for retrieving voice mails. Accordingly, the numeral "1" need not be assigned as a speed dial number for contacts. If, however, the numeral "1" is not assigned as a speed dial number for retrieving voice mails, or to perform any other functions, the numeral "1" can be assigned as a speed dial number for contacts.

Continuing with the example described with respect to FIG. 3, if the contact John Doe is assigned the speed dial indicator "2," the number "2" key can be presented in the keypad 405 with one or more identifiers associated with the contact John Doe. For example, the name "John Doe" 325 and/or an image 335 associated with "John Doe" can be presented on the number "2" key. Similarly, if the contact Jane Smith is assigned the speed dial indicator "3," the number "3" key can be presented in the keypad 405 with one or more identifiers associated with the contact Jane Smith. For example, the name "Jane Smith" 330 and/or an image 340 associated with "Jane Smith" can be presented on the number "2" key. The images presented can be retrieved from the user's contact directory, or from another suitable data source.

In other arrangements, in lieu of the names 325, 330 and/or images 335, 340, or in addition to the names 325, 330 and/or images 335, 340, other identifiers can be presented on the respective keys 405 that are assigned speed dial functionality. As noted, examples of such identifiers include, but are not limited to, displayed telephone numbers, displayed e-mail addresses, or some known codes or identifiers associated with the contacts that are assigned to speed dial indicators.

As previously described for the contact list 310 of FIG. 3, the menu 400 can automatically update, or refresh, to reflect a change in rankings of the contacts based on their geographic distance from the user. Such update can be applied to the contact menu 400 when the change in rankings is detected, or a refresh rate for the menu 400 can be applied, for example every minute, every five minutes, every ten minutes, etc. In another arrangement, once the menu 400 is opened, the menu 400 can remain static. The change in rankings can be reflected in the menu 400 when the menu 400 is closed and re-opened, reflected in the menu 400 when the user navigates away from the menu 400 and returns to the menu 400, or reflected in the menu 400 when the user selects a refresh button or key.

The user can select a speed dial indicator in any suitable manner. For example, in an arrangement in which the display is a touchscreen, the keys associated with the speed dial indicators can be selected with an appendage or stylus. In an arrangement in which the display is not a touch screen, the keys associated with the speed dial indicators can be selected with a cursor or a key stroke. For example, to initiate communication with John Doe, the user can select the number "2" key in the keypad 405. In one arrangement, to distinguish a speed dial operation from a normal key selection, the user can hold the selected number key for at least a defined period to initiate the speed dial. For example, a threshold time value of one second can be established. If the number key is held for less than one second, the number can be selected in accordance with a conventional dialing operation. If the number key is held for at least one second, then the speed dial operation can be triggered to automatically initiate communication with the contact associated with the selected number key.

Figure 5:
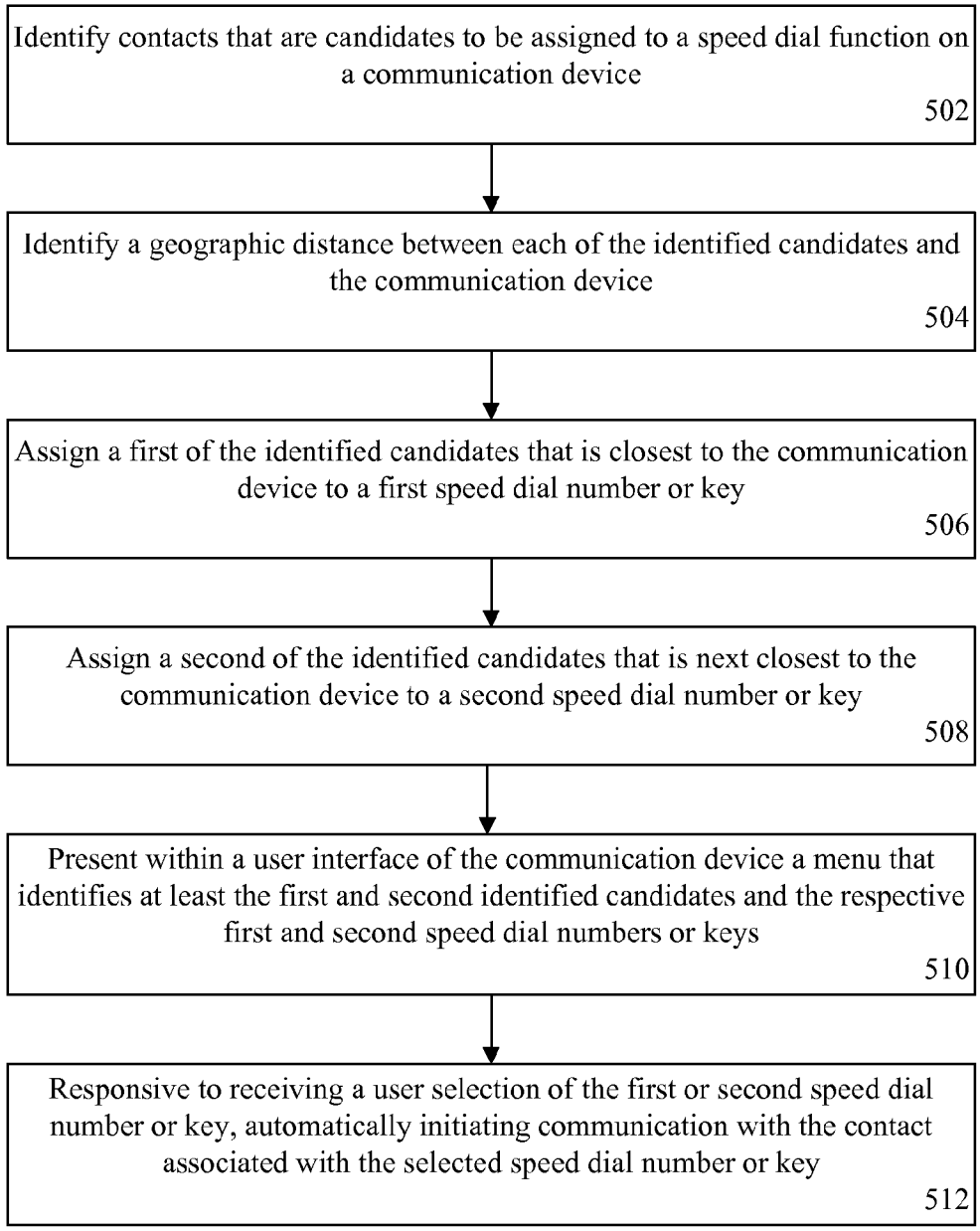
FIG. 5 is a flowchart presenting a method that is useful for understanding the present invention.

FIG. 5 is a flowchart presenting a method 500 that is useful for understanding the present invention. At step 502, contacts that are candidates to be assigned to a speed dial function on a communication device can be identified. At step 504, a geographic distance between each of the identified candidates and the communication device can be identified. For example, the geographic location of a communication device associated with each contact can be identified, and the distance between each geographic location and the present location of the user's communication device can be determined.

At step 506, a first of the identified candidates that is closest to the communication device can be assigned to a first speed dial indicator. At step 508, a second of the identified candidates that is next closest to the communication device can be assigned to a second speed dial indicator.

At step 510, within a user interface of the communication device, a menu can be presented. The menu can identify at least the first and second identified candidates and the respective first and second speed dial indicators. At step 512, responsive to receiving a user selection of the first or second speed dial indicator, communication with the contact associated with the selected speed dial indicator can be automatically initiated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-readable program code that, when being loaded and executed, controls the processing system such that it carries out the methods described herein. The present invention also can be embedded in a computer-readable storage device, such as a computer program product or other data storage device, readable by a machine, tangibly embodying a program of instructions executable by the machine to perform methods and processes described herein. The data storage device can be non-transitory in nature. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one position, key, or the like from another position, key, or the like. Thus, an ordinal term used herein need not indicate a specific position or key in an ordinal series. For example, a key identified as a "first key" may occur in a menu before or after a key identified as a "second key." Further, one or more keys may occur between the first and second keys.

This invention can be embodied in other forms without departing from the spirit or essential attributes thereof. Accordingly, reference should be made to the following claims, rather than to the foregoing specification, as indicating the scope of the invention.

What is claimed is:

1. A method of assigning contacts to a speed dial function, comprising:
   identifying contacts that are candidates to be assigned to the speed dial function on a communication device;
   identifying a geographic distance between each of the identified candidates and the communication device;
   via a processor, assigning a first of the identified candidates that is closest to the communication device to a first speed dial indicator; and
   assigning a second of the identified candidates that is next closest to the communication device to a second speed dial indicator;
   presenting within a user interface of the communication device a menu that identifies at least the first and second identified candidates and the respective first and second speed dial indicators; and
   wherein presenting within the user interface of the communication device the menu comprises presenting a favorites menu wherein the first candidate is identified in a first position of the favorites menu and the first speed dial indicator is presented proximate to an identifier associated with the first candidate, and the second candidate is identified in a second position of the favorites menu and the second speed dial indicator is presented proximate to an identifier associated with the second candidate.

2. The method of claim 1, wherein identifying contacts that are candidates to be assigned to the speed dial comprises:
   identifying contacts assigned to at least one particular contact group.

3. The method of claim 1, wherein identifying contacts that are candidates to be assigned to the speed dial comprises:
   identifying contacts who frequently communicate with a user of the communication device.

4. The method of claim 1, further comprising:
   presenting an image of the first contact in the first position of the favorites menu; and
   presenting an image of the second contact in the second position of the favorites menu.

5. The method of claim 1, further comprising:
   determining a change in at least one geographic distance between at least one of the identified candidates and the communication device;
   determining, in response to the change in the at least one geographic distance, that the second candidate is closest to the communication device and re-assigning the first speed dial indicator to the second candidate;
   determining, in response to the change in the at least one geographic distance, that the first candidate is next closest to the communication device and re-assigning the first speed dial indicator to the first candidate; and
   automatically updating the favorites menu to identify the second candidate in the first position of the favorites menu and present the first speed dial indicator proximate to the identifier associated with the second candidate, and identify the first candidate in the second position of the favorites menu and present the second speed dial indicator proximate to the identifier associated with the first candidate.

6. The method of claim 1, wherein presenting within the user interface of the communication device the menu comprises:
   presenting a dial menu comprising a plurality of keys, wherein the first candidate is identified in a first key of the dial menu and the second candidate is identified in a second key of the dial menu.

7. A method of assigning contacts to a speed dial function, comprising:
   identifying contacts that are candidates to be assigned to the speed dial function on a communication device;
   identifying a geographic distance between each of the identified candidates and the communication device;

via a processor, assigning a first of the identified candidates that is closest to the communication device to a first speed dial indicator; and assigning a second of the identified candidates that is next closest to the communication device to a second speed dial indicator:
wherein presenting within the user interface of the communication device the menu comprises presenting a dial menu comprising a plurality of keys, wherein the first candidate is identified in a first key of the dial menu and the second candidate is identified in a second key of the dial menu presenting an image of the first contact in the first key of the dial menu; and
presenting an image of the second contact in the second key of the dial menu.

8. A method of assigning contacts to a speed dial function, comprising:
identifying contacts that are candidates to be assigned to the speed dial function on a communication device;
identifying a geographic distance between each of the identified candidates and the communication device;
via a processor, assigning a first of the identified candidates that is closest to the communication device to a first speed dial indicator; and assigning a second of the identified candidates that is next closest to the communication device to a second speed dial indicator:
wherein presenting within the user interface of the communication device the menu comprises:
presenting a dial menu comprising a plurality of keys, wherein the first candidate is identified in a first key of the dial menu and the second candidate is identified in a second key of the dial menu determining a change in at least one geographic distance between at least one of the identified candidates and the communication device;
determining, in response to the change in the at least one geographic distance, that the second candidate is closest to the communication device and re-assigning the first speed dial indicator to the second candidate; and
automatically updating the dial menu to identify the second candidate in the first key of the dial menu, and identify the first candidate in the second key of the dial menu.

9. A communication device, comprising:
a processor configured to:
identify contacts that are candidates to be assigned to the speed dial function on a communication device;
identify a geographic distance between each of the identified candidates and the communication device;
assign a first of the identified candidates that is closest to the communication device to a first speed dial indicator; and
assign a second of the identified candidates that is next closest to the communication device to a second speed dial indicator:
a display that presents a user interface;
wherein the processor is further configured to present within the user interface a menu that identifies at least the first and second identified candidates and the respective first and second speed dial indicators;
the menu is a favorites menu; and
the processor further is configured to:
identify the first of the identified candidates in a first position of the favorites menu and present a speed dial indicator proximate to a name of the first of the identified candidates; and identify the second of the identified candidates in a second position of the favorites menu and present a speed dial indicator proximate to a name of the second of the identified candidates.

10. The communication device of claim 9, wherein the processor further is configured to:
present an image of the first contact in the first position of the favorites menu; and
present an image of the second contact in the second position of the favorites menu.

11. The communication device of claim 9, wherein the processor further is configured to:
determine a change in at least one geographic distance between at least one of the identified candidates and the communication device;
determine, in response to the change in the at least one geographic distance, that the second candidate is closest to the communication device and re-assigning the first speed dial indicator to the second candidate;
determine, in response to the change in the at least one geographic distance, that the first candidate is next closest to the communication device and re-assigning the first speed dial indicator to the first candidate; and
automatically update the favorites menu to identify the second candidate in the first position of the favorites menu and present the first speed dial indicator proximate to the identifier associated with the second candidate, and identify the first candidate in the second position of the favorites menu and present the second speed dial indicator proximate to the identifier associated with the first candidate.

12. A communication device, comprising:
a display; and
a processor coupled to the display, the processor configured to:
identify contacts that are candidates to be assigned to the speed dial function on the communication device;
identify a geographic distance between each of the identified candidates and the communication device;
assign a first of the identified candidates that is closest to the communication device to a first speed dial indicator; and
assign a second of the identified candidates that is next closest to the communication device to a second speed dial indicator,
the menu is a dial menu comprising a plurality of keys; and
the processor further is configured to:
identify the first of the identified candidates in a first key of the dial menu and identify the second of the identified candidates in a second key of the dial menu;
present an image of the first contact in the first key of the dial menu; and
present an image of the second contact in the second key of the dial menu.

13. A communication device, comprising:
a display; and
a processor coupled to the display, the processor configured to:
identify contacts that are candidates to be assigned to the speed dial function on the communication device;
identify a geographic distance between each of the identified candidates and the communication device;
assign a first of the identified candidates that is closest to the communication device to a first speed dial indicator; and assign a second of the identified candidates that is next closest to the communication device to a second speed dial indicator,
wherein the menu is a dial menu presented on the display and comprising a plurality of keys; and
the processor is further configured to:
  identify the first of the identified candidates in a first key of the dial menu and identify the second of the identified candidates in a second key of the dial menu;
  determine a change in at least one geographic distance between at least one of the identified candidates and the communication device;
  determine, in response to the change in the at least one geographic distance, that the second candidate is closest to the communication device and re-assigning the first speed dial indicator to the second candidate; and
  automatically update the dial menu to identify the second candidate in the first key of the dial menu, and identify the first candidate in the second key of the dial menu.

* * * * *